United States Patent [19]

Gates

[11] 4,133,437
[45] Jan. 9, 1979

[54] WHEEL CHAIR LIFT APPARATUS

[75] Inventor: F. Alan Gates, Fort Lauderdale, Fla.

[73] Assignee: Helper Industries, Inc., Fort Lauderdale, Fla.

[21] Appl. No.: 831,902

[22] Filed: Sep. 9, 1977

[51] Int. Cl.² ............................................. B60P 1/44
[52] U.S. Cl. .................................. 214/75 R; 187/24; 188/69; 214/730; 214/DIG. 13
[58] Field of Search ................ 214/75 R, 75 G, 75 T, 214/77 R, 77 P, 730, DIG. 13; 187/9 R, 10, 24; 188/69

[56] References Cited

U.S. PATENT DOCUMENTS

| 1,515,372 | 11/1924 | Smith | 188/69 |
| 3,481,499 | 12/1969 | Pierson et al. | 214/730 |
| 3,651,965 | 3/1972 | Simonelli et al. | 214/75 R |
| 3,847,292 | 11/1974 | Williams et al. | 214/75 G |
| 4,022,337 | 5/1977 | Eichenhofer | 214/730 X |
| 4,034,878 | 7/1977 | Fox | 187/10 X |

Primary Examiner—Robert G. Sheridan
Attorney, Agent, or Firm—Oltman and Flynn

[57] ABSTRACT

The present wheel chair lift apparatus has a rotatable post at the front of a doorway in the side of a van. A pivotally mounted electric motor rotates this post through a pinion and gear drive at the lower end of the post. A carriage for the wheel chair lift platform is slidable up and down along this post. A vertical lead screw is coupled to the carriage through a ball nut and a lost-motion coupling. The lead screw is driven from an electric motor through a belt and pulley drive at its upper end. The belt is frictionally restrained to prevent the lift platform from coasting down when the lead screw drive motor is stopped. The lift platform has a pivoted retainer lip at its outer edge which is pulled up before the lift platform can move up or down. The lift platform has a slidable extension for enlarging its effective size when a wheel chair comes on.

23 Claims, 14 Drawing Figures

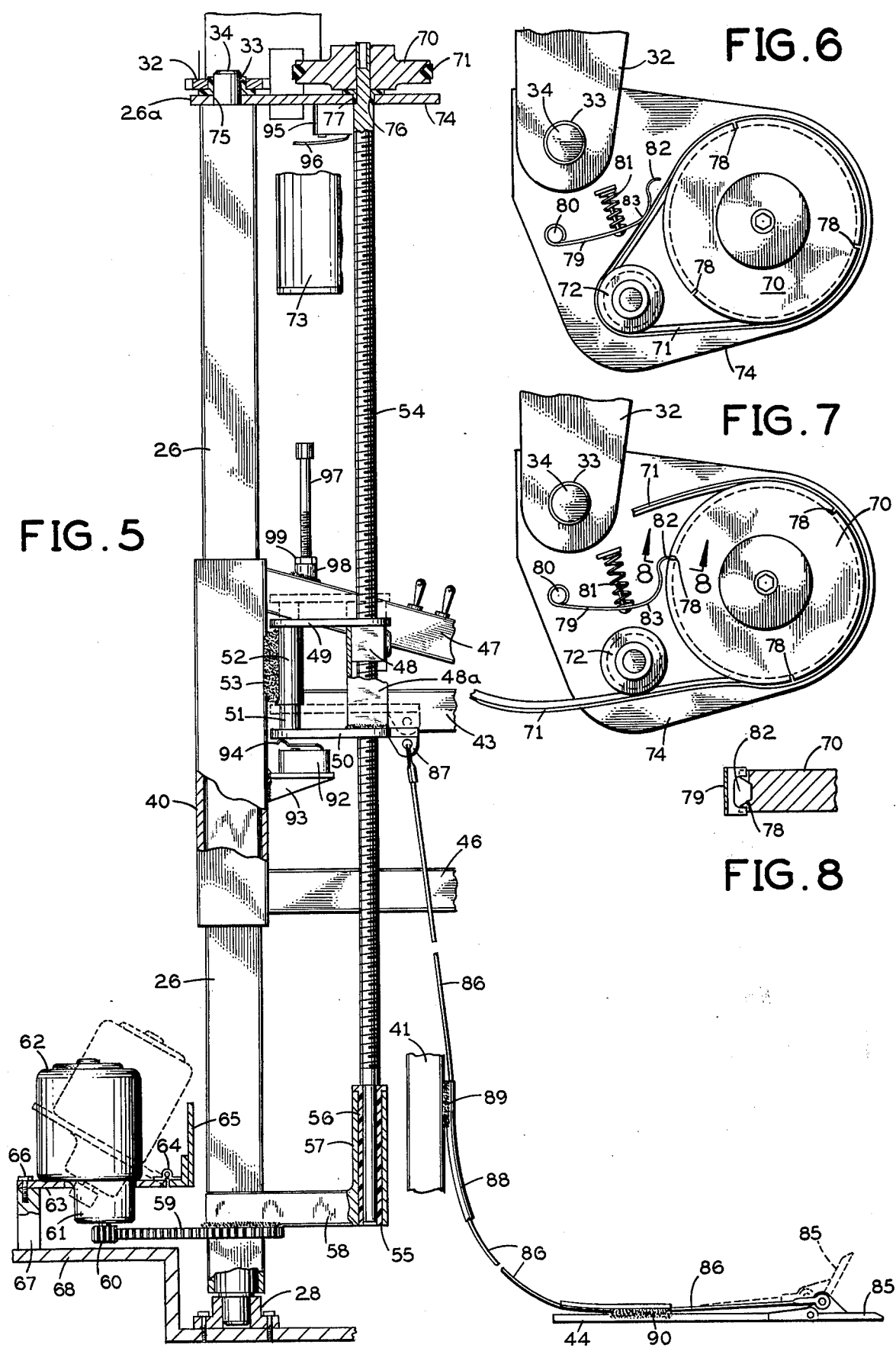

U.S. Patent  Jan. 9, 1979  Sheet 3 of 3  4,133,437
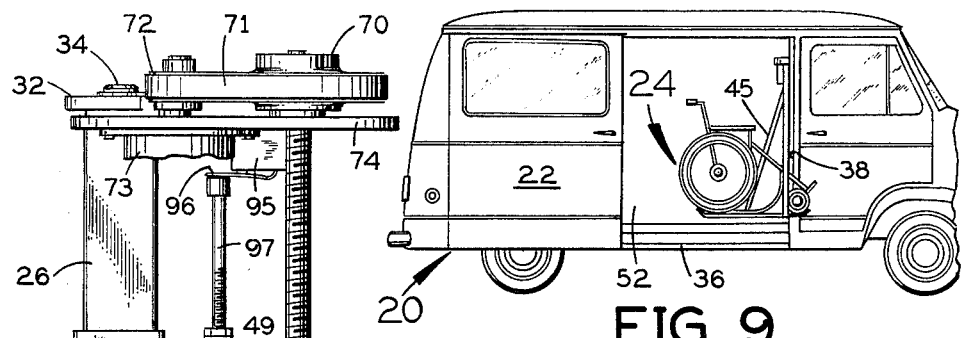
FIG. 9
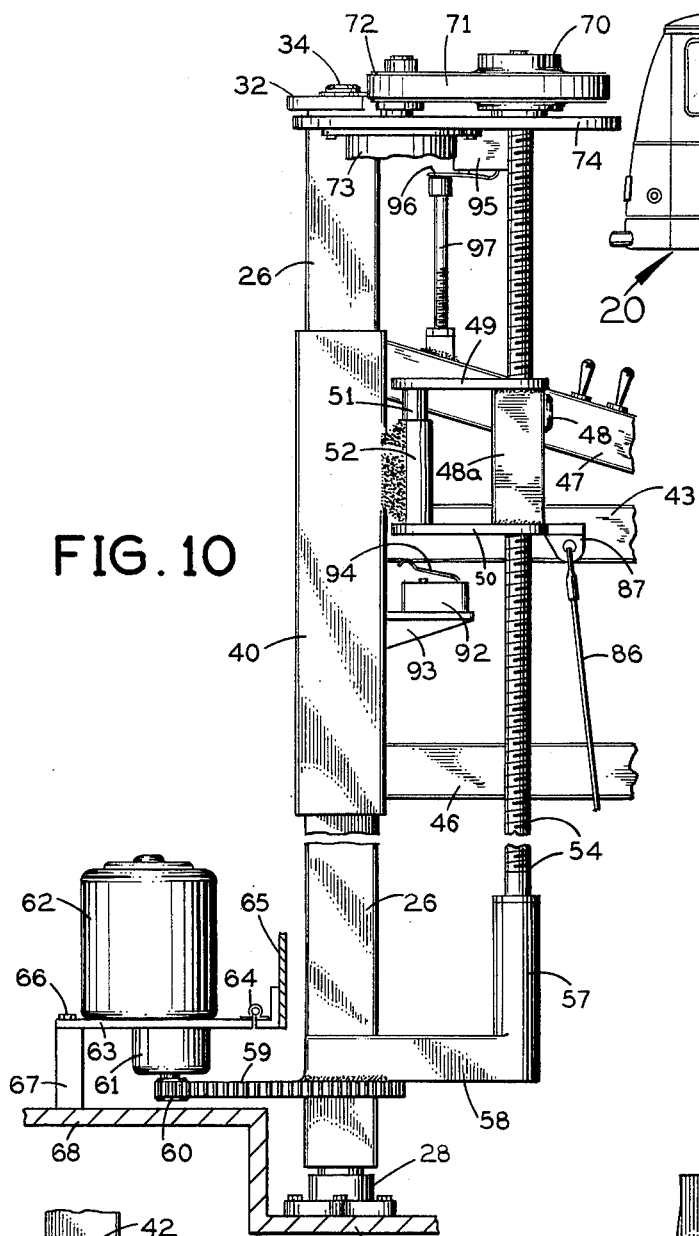
FIG. 10
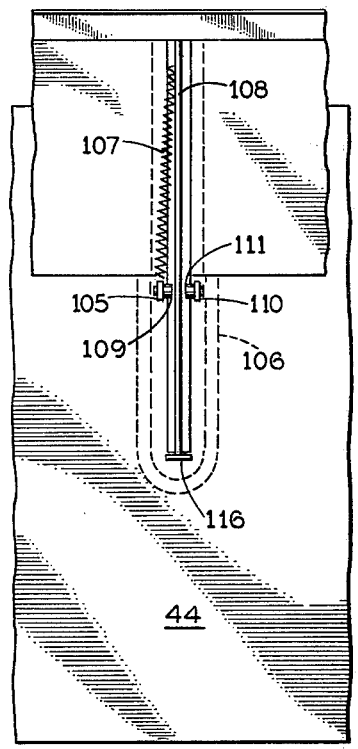
FIG. 12
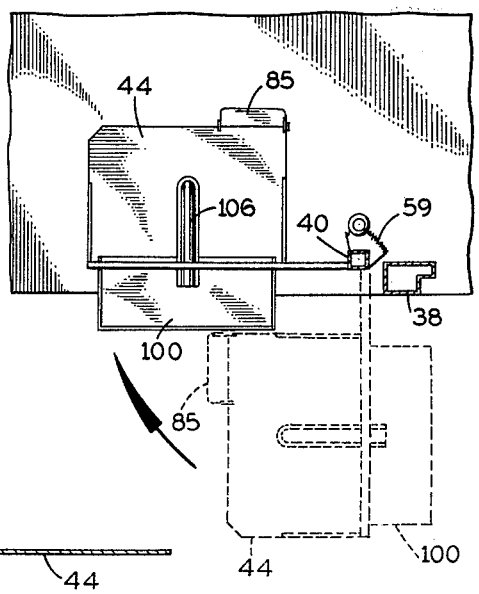
FIG. 11
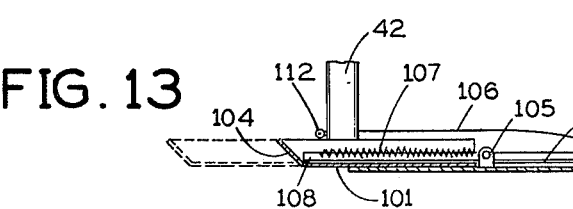
FIG. 14
FIG. 13

WHEEL CHAIR LIFT APPARATUS

BACKGROUND OF THE INVENTION

This invention relates to a vehicle-mounted wheel chair lift apparatus of the general type disclosed in our U.S. Pat. No. 3,847,292. The lift apparatus of that patent includes a horizontal lift platform which is normally stored in the van. When the occupant of a wheel chair wants to enter the van, the lift platform is raised slightly and then is pivoted horizontally out of the van and lowered vertically. After the wheel chair is on this platform it is elevated to a raised position outside the van and then is pivoted horizontally into the van slightly above floor level and then lowered to floor level. The reverse sequence of operations is carried out when the wheel chair occupant wants to leave the van. Various power-operated devices and controls are provided for effecting these operations with a minimum of effort required of the wheel chair occupant.

SUMMARY OF THE INVENTION

The present invention is directed to a wheel chair lift apparatus of the same general type but with several modifications to simplify and improve the reliability and safety of its operation.

In the presently preferred embodiment of this invention the raising and lowering of the lift platform is effected through a vertical lead screw which drives a ball nut. Preferably, a lostmotion coupling is provided between the ball nut and a carriage which is slidable vertically along a rotatably supported post. The carriage is coupled rigidly to the lift platform. The lostmotion coupling delays briefly the up or down movement of the carriage and the lift platform when the lead screw first begins to turn in either direction.

In this embodiment the lead screw is driven through a belt and pulley drive at its upper end from an adjacent electric motor. A brake applies friction to the belt to prevent the lift platform from coasting down when this motor is stopped. This brake automatically locks the lead screw in case the belt breaks.

The vertical post is rotated by a second electric motor through a gear drive. This motor is pivotally mounted at the floor of the vehicle for selectively disconnecting this gear drive.

The lift platform has a pivoted retainer lip at its outer edge for preventing the wheel chair from rolling off. This lip is raised by the ball nut whenever the lead screw is supporting the weight of the lift platform.

The lift platform also has a slidable extension which is engageable by the wheels of the wheel chair to enlarge the effective size of the lift platform when the wheel chair rolls onto it.

A principal object of this invention is to provide a novel and improved wheel chair lift apparatus on a motor vehicle, particularly a van.

Another object of this invention is to provide such an apparatus which is relatively simple mechanically while at the same time being reliable and safe in operation.

Another object of this invention is to provide a novel wheel chair lift apparatus on a vehicle which uses a motor-driven vertical lead screw for raising and lowering a horizontal lift platform.

Another object of this invention is to provide a lift apparatus as just mentioned in which the lead screw is driven through a belt and pulley drive provided with a frictional restraint for preventing the lift platform from coasting down when the lead screw drive motor is stopped.

Another object of this invention is to provide a novel wheel chair lift apparatus having a vertical lead screw for raising and lowering the lift platform, a vertically reciprocable carriage rigidly connected to the lift platform, and a novel lost-motion coupling acting between the lead screw and the carriage.

Another object of this invention is to provide a novel wheel chair lift apparatus as just described which has a retractable wheel chair retainer on the lift platform which is coupled to the lead screw substantially without lost motion so as to be raised to its wheel chair retaining position substantially as soon as the lead screw is turned in either direction for raising or lowering the lift platform through the lost-motion coupling and carriage.

Another object of this invention is to provide in a wheel chair lift apparatus a novel extension on the lift platform for automatically enlarging its effective size when a wheel chair is on the platform.

Further objects and advantages of this invention will be apparent from the following detailed description of a presently-preferred embodiment thereof, which is shown in the accompanying drawings in which:

FIG. 5 is an elevational view of the lift apparatus taken from the left side in FIG. 2 and broken away for clarity;

FIG. 6 is a fragmentary top plan view of the belt and pulley drive for the lead screw at the top of the apparatus;

FIG. 7 is a view similar to FIG. 6 but showing the pulley belt broken and the lead screw pulley braked;

FIG. 8 is an enlarged fragmentary cross-section taken along the line 8—8 in FIG. 7 and showing the pulley brake engaged;

FIG. 9 is a view similar to FIG. 1 but with the wheel chair lift inside the van;

FIG. 10 is an elevation similar to FIG. 5 but with parts shown in their position after the lift platform has been raised to slightly above the van floor level;

FIG. 11 is a schematic top plan view showing the raised lift platform swung from the phantom-line position outside the van to the full-line position inside the van;

FIG. 12 is a fragmentary top plan view of the middle of the lift platform, with parts removed for clarity;

FIG. 13 is a longitudinal vertical section taken along the centerline of the lift platform, as shown at 13—13 in FIG. 2; and FIG. 14 is a vertical section taken along the line 14—14 in FIG. 2 at one side edge of the lift platform.

Figures 1, 2, 3, 4:
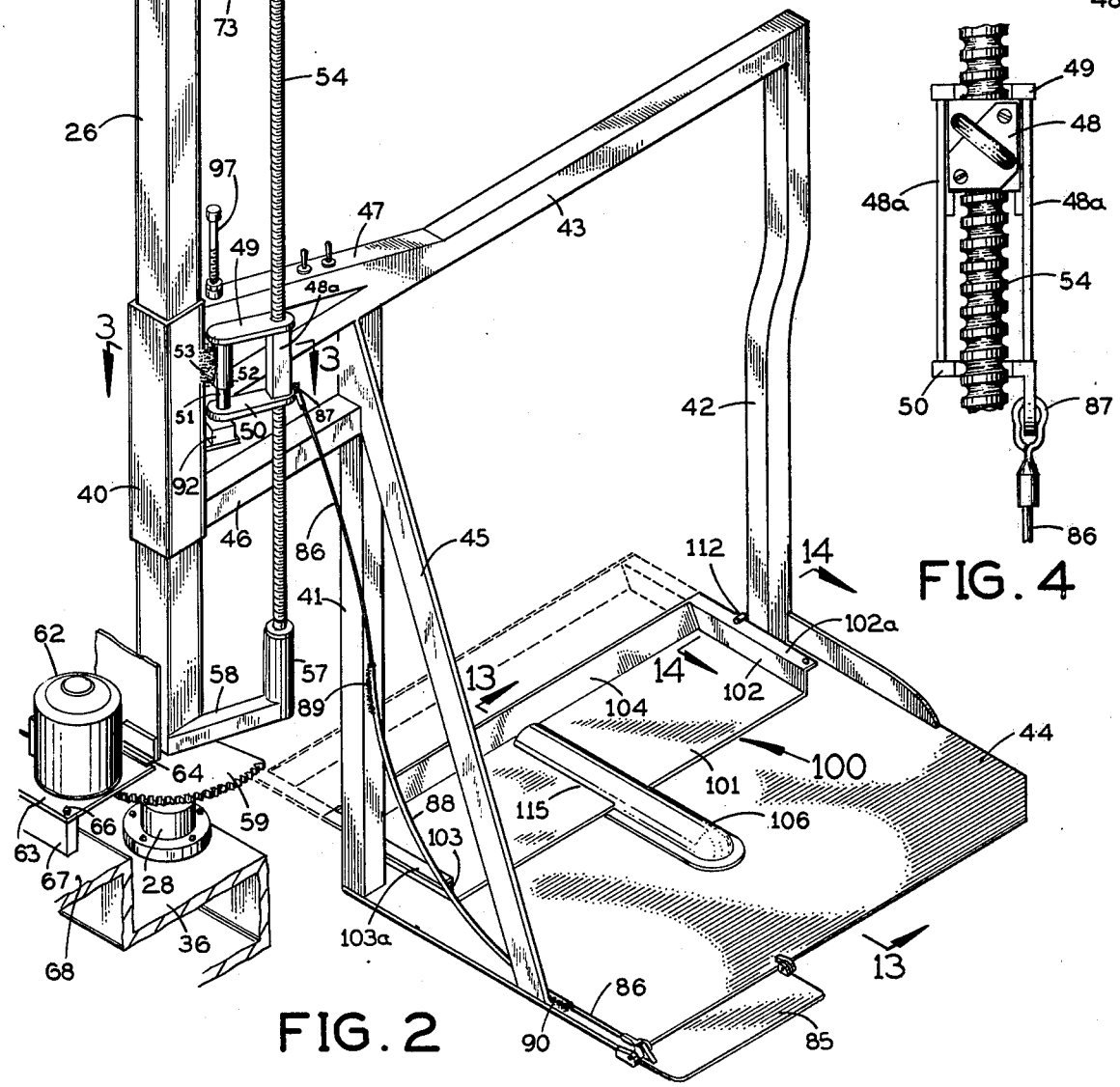
FIG. 1 is an elevational view of a van with its sliding side door open and with the present wheel chair lift lowered outside the van.
FIG. 2 is a perspective view of the present lift apparatus in its lowered position outside the van.
FIG. 3 is a horizontal cross-section taken along the line 3—3 in FIG. 2.
FIG. 4 is a fragmentary vertical end view showing part of the lead screw and ball nut assembly in this lift apparatus.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The invention is illustrated herein as applied to an automotive van 20 having a sliding door 22. A particular embodiment of the invention has been installed on a Chevrolet sliding door van, 10 Series. However, it will be understood that the invention may be applied to other vehicles.

In the van 20 the driver's seat is removed so that a wheel chair 24 can be positioned under the steering wheel. The van is especially equipped to enable the occupant of the wheel chair to drive the vehicle seated in the wheel chair 24 even though the driver may be partially disabled. Preferably, the van 20 has power brakes, power steering, and automatic transmission, and suitable controls are provided in known manner (not shown) to enable the occupant of the wheel chair to drive the van. The invention is not specifically directed to these driving controls, so they are not illustrated herein.

A support 26 in the form of a squared tubular post is mounted inside the vehicle at the front edge of a door opening 52 in its right side. The door opening is normally closed by a sliding door 22. Support post 26 is rotatably mounted on a base 28, as best seen in FIG. 5. A reduced cylindrical pivot pin 30 on the lower end of post 26 is rotatably received in the base 28. At the upper end of post 26 a similar pivot pin 34 is rotatably received in a flanged bushing 33 carried by an upper bracket 32 near the top of the door opening 52. As shown in FIG. 2, the base 28 is mounted on the door step 36 of the van, and the bracket 32 is attached to a door post 38 so that the post 26 is located inside the vehicle.

A carriage 40 of square cross-section is slidably mounted on the outside of the post 26 for up and down movement. A lift platform 44 is rigidly attached to the vertically slidable carriage 40 by means of rigid, interconnected brace members 41, 42, 43, 45, 46 and 47, as best seen in FIG. 2. These brace members form a rigid frame suspending the lift platform 44 from the carriage 40 such that the carriage, frame and platform can move together up and down along the support post 26. The frame and platform are also movable horizontally in and out of the doorway 52 when the door 22 is open since the support post 26 is rotatable relative to the base 28 and the bracket 32.

A ball nut 48 (FIGS. 3 and 5) is carried by a three-sided rectangular bracket or housing 48a which, as shown in FIG. 5, extends vertically between upper and lower horizontal plates 49 and 50 and is welded to both of them. A vertical guide post 51 extends between the upper and lower plates 49 and 50 near the vertically slidable carriage 40. A vertical sleeve 52 is welded at 53 to the carriage 40 and slidably receives the guide post 51. The sleeve 52 is shorter than the guide post 51 and therefore the unitary assembly of the ball nut carrier 48a, upper and lower plates 49 and 50, and guide post 51 can move up and down a limited amount with respect to the sleeve 52 and the carriage 40 which supports the sleeve.

The ball nut 48 engages a vertically elongated lead screw 54. The lower end of this lead screw carries an elongated pivot pin 55 (FIG. 5) which is rotatably received in an antifriction bushing 56. This bushing is carried by an upstanding hollow collar 57 on the outer end of a rigid horizontal arm 58, whose opposite end is rigidly joined to the post 26 a short distance above the latter's lower end.

A horizontally disposed gear sector 59 is welded to the post 26 and the underside of the connecting arm 58. This gear sector is engaged by a pinion 60 (FIG. 5) driven through a gear reduction 61 from an electric motor 62 above. This post driven motor and gear reduction unit is mounted on a normally horizontal panel 63, which is pivotally connectd at 64 to the lower end of a vertical wall segment 65 of the van body at its doorway 52. Normally, the pivoted motor-support panel 65 is rigidly attached by bolts 66 to a rigid spacer 67 which extends up from the floor 68 of the van, as shown in full lines FIG. 5. However, after removing the bolts, the motor-support panel 63 may be pivoted up to the phantom-line position in FIG. 5 so as to disengage the motor-driven pinion 60 from the gear sector 59. This facilitates servicing of this pinion-and-gear drive.

The upper end of the lead screw 54 carries a pulley 70 which is driven through a flexible endless belt 71 from a smaller pulley 72 (FIG. 2) which is driven by an electric motor 73. This lead screw drive motor is mounted on the bottom of a horizontal support plate 74 which, as shown in FIG. 5, has a circular opening 75 through which the upper pivot pin 34 on the post 26 extends. Adjacent this opening 75 the plate 74 is clamped between a transverse, upwardly-facing shoulder 26a on the post 26 at the lower end of its upper pivot pin 34 and the transverse flange on the bottom of the bushing 33, so that the plate 74 will turn in unison with the post 26 when the latter is rotated.

As shown in FIG. 5, the motor-support plate 74 has another vertical opening 76 in which is located a flanged anti-friction bushing 77 which receives a pivot pin on the upper end of the lead screw 54. The pulley 70 is fastened to this upper pivot pin and it rests on the flange of bushing 77 which overlies the motor-support plate 74 at the opening 76 in the latter.

In accordance with an important aspect of this invention the lead screw 54 is frictionally restrained against rotating when its drive motor 73 is stopped. The weight on the lift platform and the very low friction between the ball nut 48 and the lead screw would tend to produce slow rotation of the lead screw that would cause the lift platform to coast down when motor 73 is not raising it. A flexible and resilient finger 79 of spring steel or other suitable material is fastened at one end to a boss or post 80 which extends up from the motor-support plate 74, as best seen in FIG. 2. A coil spring 81 urges the hooked opposite, free end 82 of the spring finger 79 clockwise in FIG. 6. Normally a curved portion 83 of the finger between its hooked, free end 82 and the coil spring 81 bears frictionally against the outside of the belt 71, exerting enough restraint to prevent the lead screw from being turned by the weight on the lift platform in a direction for lowering the lift platform when motor 73 is off. Also, if the belt 71 breaks (FIG. 7), the hooked end of finger 79 will move into engagement with the periphery of the pulley 70 and will snap into the first notch 78 in the latter's periphery to reach it, so as to lock the pulley 70 and the lead screw 54 against rotation.

In accordance with another important aspect of this invention the horizontal lift platform 44 is provided with a pivoted retaining lip 85 at its outer edge. Normally, as shown in FIG. 2, this lip extends horizontal, substantially co-planar with the floor of the lift platform 44. After the wheel chair is on the lift platform, the lip 85 may be pivoted up (counter-clockwise in FIG. 2) to the upwardly projecting position (shown in FIG. 1)

behind the adjacent wheel 24 of the wheel chair, so that the wheel chair cannot accidentally roll off the lift platform.

The lip 85 is pivotally actuated through a Bowden wire 86 which has its upper end hooked to an eye 87 (FIGS. 4 and 5) integral with the aforementioned lower plate 50 associated with the ball nut 48. The Bowden wire extends slidably through a curved guide sleeve 88 which has its upper end welded or otherwise attached at 89 (FIG. 2) to the upstanding brace member 41 and its lower end similarly attached at 90 to the lift platform 44.

Normally, the parts are positioned as shown in full lines in FIG. 5, with the Bowden wire 86 slack, the retainer lip 85 extending horizontally out from the lift platform 44, the upper plate 49 resting on top of the carriage-attached sleeve 52, and the lower plate 50 spaced below the bottom of sleeve 52. When the unitary assembly of the ball nut housing 48a, upper and lower plates 49 and 50, and guide post 51 moves up with respect to the carriage-attached sleeve 52, to the phantom-line position in FIG. 5, the Bowden wire 86 is pulled up with it and it pulls the retainer lip 85 up to the phantom-line position shown, in which it projects up from the outer edge of the lift platform.

A limit switch 92 is carried by a bracket 93 welded to the vertically slidable carriage 40. The movable actuator 94 for this switch is positioned to be engaged by the lower plate 50 which is part of the lost-motion coupling between the ball nut 48 and the carriage 40. When the weight of this carriage, the rigid framework 41-47 and the lift platform 44 is not being carried by the lead screw 54, such as when the lift platform is resting on a sidewalk or on the van floor, the switch actuator 94 will be engaged by plate 50 (for example, as shown in full lines in FIG. 5). When the lead screw 54 is supporting the weight of the lift platform, carriage and framework, the lower plate 50 will be displaced up away from engagement with the switch actuator 94. Thus, the switch 92 senses whether or not the lead screw is carrying this weight.

Limit switch 92 is normally closed and is operatively connected electrically to the motor 73 for stopping the latter when the lift platform can be lowered no farther. A manual switch is provided for raising and lowering the lift platform. With the manual switch held in its "lower" position the platform will come down until limit switch 92 is operated (opened) and this shuts off the motor 73.

A normally closed upper limit switch 95 with a pivoted actuator 96 is mounted on the bottom of the support plate 74 for the lead screw motor 73. The switch actuator 96 is positioned in the path of upward movement of a bolt 97 whose lower end is threaded into a fitting 98 on top of the inclined brace member 47. A lock nut 99 threadedly engages the bolt 97 above this fitting to lock the bolt in any vertical position to which it has been threadedly adjusted.

Switch 95 is connected to the lead screw drive motor 73 to turn it off when its actuator 96 is engaged by the bolt 97 after the carriage 40 and lift platform have moved up. The manual switch is held in its "raise" position to energize motor 73 for raising the lift platform until the upper limit switch 95 is operated (opened) and shuts off motor 73.

In accordance with another aspect of the present invention, the lift platform has a slidable extension 100 overlying the main section 44 of the lift platform at its inner edge. This extension has a flat bottom wall 101, upstanding opposite sides 102 and 103 with outwardly projecting horizontal flanges 102a and 103a at their upper ends, and an upwardly inclined end wall 104 at the end away from the pivoted retainer lip 85 on the outer edge of the lift platform.

When the wheels of the wheel chair roll onto the lift platform (from right to left in FIG. 2) they engage the end wall 104 of the extension 100 and move the latter from the normal full-line position to the inwardly extended phantom-line position in FIG. 2.

The main section 44 of the lift platform has a centrally located, upwardly projecting ear 105 (FIGS. 12 and 13) inside a tunnel 106 (FIG. 2) on top. A tension coil spring 107 is connected at one end to this ear and at its opposite end to a centrally located, longitudinally extending, inverted T-shaped rib 108 attached to the top of the slidable extension 100 and extending horizontally outward from it across the top of the main section 44 of the lift platform. Spring 107 biases the extension 100 to the retracted, full-line position in FIG. 13 but permits the extension to be displaced to inwardly extended, phantom-line position.

The aforementioned ear 105 rotatably supports a roller 109 which overlies one horizontal bottom leg of the inverted T-shaped rib 108 on the lift platform extension 100. A similar ear 110 extends up from the main section 44 of the lift platform on the opposite side of the ear 108 and it carries a roller 111 which overlies the bottom leg of the ear on this side. These two sets of ears and roller 105, 109, 110 and 111 guide the longitudinal rib 108 on the lift platform extension 100 as it slides in either direction over the main section 44 of the lift platform.

As shown in FIG. 14, at the right side of the lift platform in FIG. 2 a pair of upper and lower cylindrical guides 112 and 113 extend above and below the side flange 102a on the lift platform extension 110. These guides are carried by a U-shaped support member 114 which is welded to the vertical frame piece 42 at this side of the lift platform.

A similar guide arrangement is mounted on the vertical frame piece 41 on the left side of the lift platform in FIG. 2, presenting upper and lower guides above and below the corresponding side flange 103a on the slidable extension 100 of the lift platform.

The tunnel 106 on top of the main section 44 of the lift platform is longitudinally slotted at 115 on each side at its inner end to slidably receive the bottom wall 101 of the slidable extension 100, as shown in FIG. 2.

OPERATION

In the operation of this apparatus, with the van door 22 open (FIG. 1), the lift platform is lowered onto the sidewalk or street surface on which the wheel chair rests. With the retainer lip 85 on the lift platform in its lowered, horizontally extended position, the wheel chair is rolled onto the lift platform. The wheels of the wheel chair engage the inclined inner end wall 104 of the lift platform's slidable extension 100 and push the latter from the retracted, normal, full-line position in FIG. 2 to the inwardly extended, phantom-line position, thereby effectively enlarging the size of the lift platform.

When the user operates the manual switch for raising the lift platform, the first thing that happens is that the retainer lip 85 on the outer edge of the lift platform is pivoted up to the raised position shown in FIG. 1, so as to engage the back of one of the wheels and prevent the wheel chair from accidentally rolling off the lift platform. This initial action takes place as follows:

The manual "raise" switch turns on the motor 73 which drives the lead screw 54 in a direction for raising the ball nut 48. The upward movement of the ball nut is imparted first to the unitary assembly of the three-sided ball nut carrier 48a, the upper and lower plates 49 and 50, and the guide post 51, so that this unitary assembly first moves up about an inch from the full line position in FIG. 5 (FIG. 2 also) to the phantom-line position in FIG. 5 (which is the full-line position in FIG. 10). The carriage 40 remains stationary during this initial movement and the unitary ball nut assembly moves up with respect to the guide sleeve 52 fixed to the carriage. This initial upward movement of the ball nut is imparted through the Bowden wire 86 to the retainer lip 85 to pivot the latter up to its wheel-retaining position, shown in phantom FIG. 5.

Continued rotation of the lead screw 54, after the bottom plate 50 in the lost-motion coupling engages the lower end of the guide sleeve 52, now causes the carriage 40 to move up in unison with the ball nut assembly. The carriage 40 slides up along the vertical post 26, carrying the lift platform with it. This lost-motion upward movement of the bottom plate 50 also releases the actuator 94 for the lower limit switch 92, so that the release of this switch occurs when the lead screw 54 begins to carry the weight of the carriage, framework and lift platform.

When the upper limit switch actuator 96 is operated, the lead screw motor 73 is turned off. This happens when the bottom of the lift platform has reached a vertical position slightly higher than the floor of the vehicle.

The next step is to rotate the post 26 to bring the lift platform from its raised position outside the vehicle to a raised position inside the vehicle. This may happen automatically following the actuation of the upper limit switch 95 or it may be effected through a manual switch operated by the occupant of the wheel chair. In either case the motor 62 now is turned on and through the pinion 60 and gear sector 59 it rotates the post 26 in a direction to swing the lift platform inside the van slightly above the floor of the van.

At the completion of this operation, the post drive motor 62 is turned off, either automatically or manually, and motor 73 is energized, either automatically or through a manual switch, to drive the lead screw 54 in the reverse direction for lowering the ball nut assembly. The lift platform is lowered onto the floor of the van and then as the lead screw 54 continues to run in reverse it causes the ball nut assembly to move down with respect to the now-stationary guide sleeve 52 and the carriage 40. This causes the Bowden cable 86 to lower the retaining lip 85 on the lift platform, so that the wheel chair can be rolled off the lift platform onto the floor of the van.

When the wheel chair is to be moved out of the van onto the sidewalk, for example, the foregoing operating sequence is reversed.

It will be evident from the foregoing that the lost-motion coupling which acts between the ball nut 48 and the carriage insures that the retaining lip 85 on the lift platform will be in its raised position whenever the lead screw 54 is carrying the weight of the lift platform. The retaining lip 85 will be down only when the lift platform has its weight resting on some support surface, such as the van floor or the sidewalk outside.

With the lead screw drive motor 73 stopped, the weight of the wheel chair and its occupant on the lift platform, acting through the low friction coupling between the ball nut 48 and the lead screw 54, is prevented from slowly rotating the lead screw in a direction for lowering the lift platform because of the frictional restraint which the finger 79 exerts on the pulley belt 71. Accordingly, under these circumstances the lift platform cannot coast down along the lead screw. Also, if the pulley belt 71 breaks this finger 79 will automatically engage a notch in the pulley 70 on the upper end of the lead screw 54 to prevent lead screw rotation.

I claim:

1. In a wheel chair lift apparatus on a vehicle having:
   a horizontal lift platform;
   a rotatable vertical support post;
   a carriage slidable vertically along said support post and operatively coupled to said support post to turn in unison with it;
   and means rigidly coupling said lift platform to said carriage for movement in unison with it;
   the improvement which comprises
   a rotatable, vertical, power-driven lead screw for raising and lowering said carriage along said support post;
   retractable retainer means operatively associated with said lift platform for movement between a retracted position in which it permits the wheel chair to move on or off the lift platform and a raised position in which it retains the wheel chair on the lift platform;
   and means responsive to the operation of the lead screw for maintaining said retainer means in its raised position whenever the lead screw is carrying the weight of the carriage and lift platform.

2. An apparatus according to claim 1, wherein said last-mentioned means includes:
   a ball nut engaging the lead screw to move vertically along the lead screw in response to lead screw rotation;
   means operatively coupling said ball nut to said retainer means for imparting the ball nut movement to said retainer means substantially without lost motion;
   and a lost-motion coupling acting between said ball nut and said carriage.

3. An apparatus according to claim 2, wherein said means operatively coupling said ball nut to said retainer means comprises a flexible cable having its upper end operatively connected to said ball nut and its lower end operatively connected to said retainer means.

4. An apparatus according to claim 3, wherein said retainer means is a horizontally pivoted lip at the outer edge of said lift platform.

5. An apparatus according to claim 2, wherein said lost-motion coupling comprises:
   a vertical sleeve affixed to said carriage;
   a vertical guide post extending slidably through said sleeve, said guide post being longer than said sleeve;
   upper and lower horizontal plates respectively engaging the top and bottom of said guide post and extending laterally therefrom to said lead screw;
   and a carrier for the ball nut attached to said upper and lower plates and extending vertically between them at the lead screw.

6. An apparatus according to claim 5, wherein:

said retainer means is a horizontal pivoted lip at the outer edge of said lift platform;

and said means for moving the lip from its retracted position to its raised position is a flexible cable having its upper end attached to said lower plate in said lost-motion coupling and its lower end connected to said lip.

7. An apparatus according to claim 5 and further comprising:
a motor-support plate coupled to said support post at its upper end to turn therewith and extending horizontally therefrom toward said lead screw;
a lead screw drive motor attached to the bottom of said motor support plate;
a drive pulley connected to said motor above said motor-support plate;
a driven pulley connected to the upper end of said lead screw and overlying said motor-support plate;
and an endless flexible belt operatively engaging said pulleys to impart the motor drive from the drive pulley to the driven pulley.

8. An apparatus according to claim 7, and further comprising means for preventing said lead screw from rotating under the weight on the lift platform when said lead screw drive motor is stopped.

9. An apparatus according to claim 8, wherein said last-mentioned means comprises a finger which is spring-biased frictionally against the outside of said belt.

10. An apparatus according to claim 9, and further comprising:
a gear member attached to said support post near its lower end and extending horizontally therefrom;
a post drive motor;
and a pinion operatively connected to said last-mentioned motor and meshing with said gear member to rotate said support post from said last-mentioned motor.

11. An apparatus according to claim 10, and further comprising means pivotally supporting said post drive motor near the floor of the vehicle for adjustment from a normal operative position in which said pinion meshes with said gear member and a retracted position disengaging said pinion from said gear member.

12. An apparatus according to claim 1, and further comprising:
an extension slidably mounted on said lift platform between a retracted position in overlapping relationship therewith and an extended position for increasing the effective size of the lift platform.

13. An apparatus to claim 12, and further comprising:
spring means biasing said extension to its retracted position;
and wherein:
said extension has an upstanding inner end wall for engagement by the front of the wheels on the wheel chair as the latter rolls onto the lift platform to push the extension to its extended position against the bias exerted by said spring means.

14. An apparatus according to claim 2, and further comprising:
a drive motor operatively coupled to said lead screw for rotating the latter;
and means for preventing rotation of the lead screw under the weight on the lift platform when said drive motor is stopped.

15. An apparatus according to claim 14, and further comprising:

a motor-support plate coupled to said support post at its upper end to turn therewith and extending horizontally therefrom toward said lead screw;
said drive motor being attached to the bottom of said motor-support plate;
a drive pulley connected to said motor above said motor-support plate;
a driven pulley connected to the upper end of said lead screw and overlying said support plate;
and an endless flexible belt operatively engaging said pulleys to impart the motor drive from the drive pulley to the driven pulley.

16. An apparatus according to claim 15, wherein said means for preventing rotation of the lead screw when said drive motor is stopped comprises a finger which is spring-biased frictionally against the outside of said belt.

17. In a wheel chair lift apparatus on a vehicle having:
a horizontal lift platform;
a rotatable vertical support post;
a carriage slidable vertically along said support post and operatively coupled to said support post to turn in unison with it;
means rigidly coupling said lift platform to said carriage for movement in unison with it vertically between a lowered position outside the vehicle and a raised position outside the vehicle and horizontally between said raised position outside the vehicle and a position inside the vehicle;
a rotatable, vertically disposed lead screw;
a follower nut engaging said lead screw for vertical movement therealong;
means coupling said nut to said carriage to move the latter vertically in response to vertical movement of the nut;
a lead screw drive motor operatively coupled to said lead screw for driving the latter;
and means for preventing the lead screw from rotating under the weight on the lift platform when said motor is stopped;
the improvement wherein said motor is operatively coupled to said lead screw through a drive pulley connected to the motor, a driven pulley connected to the lead screw, and an endless flexible belt operatively engaging said pulleys to impart the motor drive from the drive pulley to the driven pulley, and said last-mentioned means comprises a finger which is spring-biased frictionally against said belt.

18. An apparatus according to claim 17, and further comprising:
a motor-support plate coupled to said support post at its upper end to turn therewith and extending horizontally therefrom toward said lead screw;
said lead screw drive motor being mounted on the bottom of said plate;
said drive pulley being connected to said motor above said plate;
and said driven pulley being connected to the upper end of the lead screw above said plate.

19. An apparatus according to claim 17, wherein:
said driven pulley has a plurality of circumferentially spaced notches in its periphery;
and said locking finger is spring-biased toward the periphery of the driven pulley for locking engagement in one of said notches if the belt breaks.

20. In a wheel chair lift apparatus on a vehicle having:
a horizontal lift platform;
a rotatable vertical support post;

a carriage slidably vertically along said support post and operatively coupled to said support post to turn in unison with it;

and means rigidly coupling said lift platform to said carriage for movement in unison with it vertically between a lowered position outside the vehicle and a raised position outside the vehicle and horizontally between said raised position outside the vehicle and a position inside the vehicle;

the improvement which comprises;

a gear member attached to said support post near its lower end and extending horizontally therefrom;

a post drive motor;

a pinion operatively connected to said last-mentioned motor and meshing with said gear member to rotate said support post from said last-mentioned motor;

and means pivotally supporting said post drive motor near the floor of the vehicle for adjustment from a normal operative position in which said pinion meshes with said gear member and a retracted position disengaging said pinion from said gear member.

21. In a wheel chair lift apparatus on a vehicle having:
a horizontal lift platform;
means for lowering said lift platform to a position outside the vehicle and for raising said lift platform from said lowered position outside the vehicle;
and means for swinging the raised lift platform horizontally into or out of the vehicle;

the improvement which comprises:

an extension slidably mounted on said lift platform between a retracted position in overlapping relationship therewith and an extended position for increasing the effective size of the lift platform;

and spring means biasing said extension to its retracted position.

22. A lift apparatus according to claim 21, wherein said extension has an upstanding inner end wall for engagement by the front of the wheels on the wheel chair as the latter rolls onto the lift platform to push the extension to its extended position against the bias exerted by said spring means.

23. A lift apparatus according to claim 22, and further comprising:

a retainer lip pivoted to the outer end of said lift platform;

and means for raising said lip to extend up from the lift platform when the lift platform is to be raised.

* * * * *